United States Patent [19]

Söderberg

[11] 4,448,112
[45] May 15, 1984

[54] VENTILATOR

[76] Inventor: Ramon Söderberg, Sörgårdsvägen 5, S-443 00 Partille, Sweden

[21] Appl. No.: 359,657
[22] PCT Filed: Jul. 14, 1980
[86] PCT No.: PCT/SE80/00189
  § 371 Date: Mar. 8, 1982
  § 102(e) Date: Mar. 8, 1982
[87] PCT Pub. No.: WO82/00336
  PCT Pub. Date: Feb. 4, 1982
[51] Int. Cl.³ .............................................. B63J 2/04
[52] U.S. Cl. ........................................ 98/62; 114/211
[58] Field of Search ................... 98/2.14, 8, 9, 32, 35, 98/62; 114/211, 212

[56] References Cited
U.S. PATENT DOCUMENTS

| | | | |
|---|---|---|---|
| 45,814 | 1/1865 | Burnett | 98/62 |
| 49,374 | 8/1865 | Burnett | 114/211 |
| 217,712 | 7/1879 | Smith | 98/62 |
| 1,289,821 | 12/1918 | Laakso | 98/62 |

Primary Examiner—Albert J. Makay
Assistant Examiner—Harold Joyce

[57] ABSTRACT

A ventilator for air ventilation between a delimited space and the outside air. Extending through the ventilator is a connecting passage (4) which is divided into a plurality of passage sections (10) which are delimited from one another by means of at least one outer wall portion (7/20/32) and partitions (8) which are directed symmetrically with substantially the same length outwards from the central longitudinal axis (9) of the connecting passage (4). The sections are adapted to maintain communication between the outside air and said space and comprise in their outer ends, facing the outside air, an outer opening (13) and in their inner end, facing the space, an inner opening. The outer openings are directed sideways in relation to the longitudinal axis (9) of the connecting passage (4) so that the openings are distributed over the periphery of the ventilator. The angle between two adjacent partitions (8) is so small that, regardless of the direction of an external stream of air, directed substantially transversely to said longitudinal axis (9) at least two of the partitions (8) belonging to any of the passage sections facing the stream of air are always substantially set obliquely towards the main direction of the stream of air. As a result, with every direction of the wind, at least one funnel-shaped inlet is directed towards the wind.

5 Claims, 12 Drawing Figures

VENTILATOR

TECHNICAL FIELD

The present invention relates to a ventilator for ventilation between a limited space and the outside air. The ventilator is of the type wherein the flow of outside air past the ventilator is used to convey air to and from the space, so that a circulation is obtained.

BACKGROUND ART

In order that the flow of outside air may be able to be used to convey air to and from the space it is necessary for the inflowing air to be caught by an opening which is facing in the direction of the wind, while the air which is to be conveyed out of the space is permitted to flow out at the leeward side. Ventilators, which use this principle as a result of the fact that a hood is permitted to swing by means of a weather vane, were known previously. With such a construction, the effect is achieved that the hood always has an intake opening in the direction of the wind and an outflow opening at the leeward side. Nevertheless, the operation of such ventilators depends entirely on the hood being free to swing and ventilators of this type have not proved reliable, particularly when there is a risk of the formation of ice and driving snow. Other attempts at providing passages in a fixed housing, which provide inwardly and outwardly directed flows have not led to the intended effect and provide too weak a ventilation for the majority of purposes as well as being dependent on the wind direction in an unintended manner.

TECHNICAL PROBLEM

The problem which the present invention is intended to solve is therefore to provide a ventilator which is capable both of forcing air into a space and of sucking air out thereof, to bring about a circulation without using mechanical means but simply by means of the flow of outside air. The requirement is that the ventilator should not need any readjustment after a change in wind direction, either manually or, for example, by the action of the wind. Thus the ventilator should fulfil its function substantially without movable parts.

BRIEF DESCRIPTION OF DRAWINGS

The invention will be described in more detail below with some examples of embodiment with reference to the accompanying drawings of which FIG. 6 is a cross-section through the ventilator on the line VI—VI in FIG. 5, FIGS. 7 and 8 show a second and third form of embodiment respectively of the ventilator according to the invention, while

THE SOLUTION

The basic principle of the ventilator according to the present invention is that a passage connection between the environment and the space intended for ventilation is divided up into a plurality of passage sections delimited from one another. These are adapted to maintain separate flows of incoming and outgoing air for communication between the outside air and the delimited space. As a result of the flow of the outside air past the ventilator, excess pressure develops in certain sections and low pressure in others. The passage sections in which excess pressure develops in relation to the delimited space, act as air intakes, while the passage sections in which low pressure prevails in relation to said space act as evacuation passages for air from the space to the outside air. This means that with a wind direction of the external flows of air in the direction of the arrows in full lines shown in FIG. 1, excess pressure is obtained in the passage sections designated by d–f, through which fresh air is taken in, while low pressure develops in the sections designated by a–c, with the result that air is evacuated through these passage sections.

Figure 1:
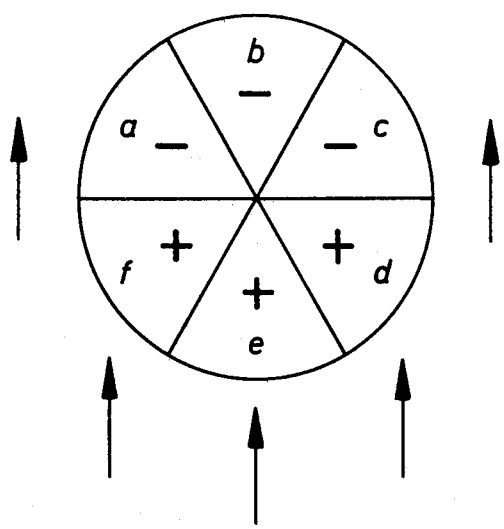
FIGS. 1–3 show the basic principle of the present invention.
Figure 2:
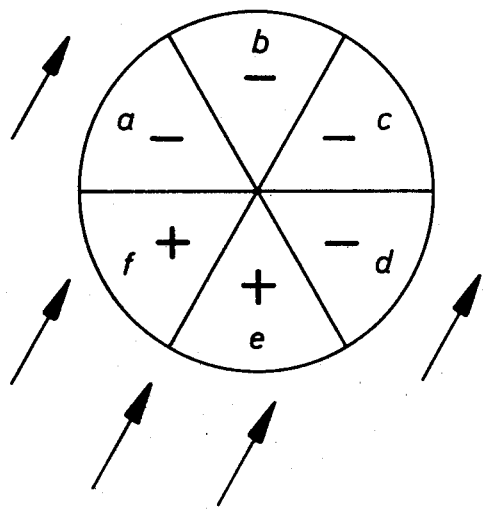

The number of passage sections may vary but should be at least six. With a wind direction as shown in FIG. 1, a powerful excess pressure occurs in the passage section e, but relatively little excess pressure occurs in the passage sections d and f. Low pressure occurs in the passage sections a, b and c. Note that low pressure does not occur in the passages d and f, so that a well-balanced pressure relationship occurs. With a wind direction as shown in FIG. 2, a distinct excess pressure occurs in the passage sections e and f, while low pressure occurs in the other sections. In this case, therefore, low pressure is obtained in a sector which is larger than the sector where excess pressure prevails. Nevertheless, there is a distinct excess pressure which is balanced by an equally distinct low pressure.

As a result of making the ventilator with the given construction, regardless of the wind direction, at least one pressure section is always obtained which is turned towards the direction of the wind in a funnel-like manner. This is particularly important with low wind speeds when the need for ventilation is often greatest.

From the theoretical explanations with reference to FIGS. 1 and 2, it can be seen that the number of passage sections with a clearly defined excess pressure tends to be below the number of passage sections with a clearly defined low pressure, but this has proved to give very favourable pressure conditions, because of the general rule that excess pressure at the pressure side is always greater than the low pressure at the leeward side, which according to the invention has thus proved to lead to pressure equalization in the enclosed ventilated space.

The invention is not a result of a simple dimensioning measure with a successive improvement of the ventilation characteristics in proportion to the number of passage sections. As a result of the effects described above of the direction of the passage sections in relation to the direction of the wind, it has actually been found that a sudden improvement in the ventilation is obtained for all wind directions by means of a sector angle which is selected so that at least two of the partitions situated at the pressure side are always set towards the direction of the wind.

Figure 3:
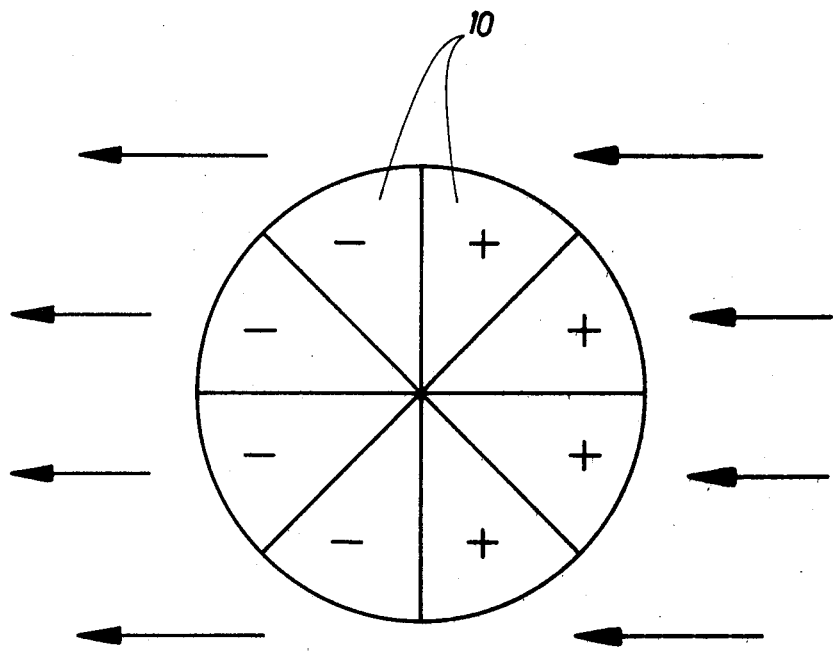

In order to achieve this effect, at least six sections arranged in the form of a star are required, as stated. With a larger number, an even more even balance between excess pressure and low pressure is obtained with different wind directions, the whole way round. In FIG. 3, eight sections are shown, which also applies to the examples of embodiment described. Observation of FIG. 3 shows that at least three and at most four sections are always so placed in the direction of the wind that they receive an excess pressure while a low pressure is obtained in four or five sections. Thus the most uneven proportion between excess pressure and low pressure is 3:5 and a satisfactory operation is thus obtained with all directions of the wind.

With a larger number of sections, the partitions take up more space while at the same time the passage area for the individual passages is reduced. This leads to greater resistance to flow. For ventilators within the commonest range of sizes, a number of eight for the sections should provide the optimum average flow with all wind directions. As stated, six sections produces somewhat more uneven flow conditions but the number lies within the usable range.

With fewer sections than six, an unreliable operation is obtained and with certain directions of the wind a very poor or non-existent flow through. With four sections the conditions are such that if one of the partitions is set directly in the direction of the wind, no excess pressure is obtained in practice in the sections facing the direction of the wind, one wall of which is thus parallel to the direction of the wind and the other wall at right angles thereto. It might certainly have been expected that the braking of the wind against the walls set at right angles would produce an excess pressure but this is not the case. Instead turbulence is formed so that it is even possible to obtain low pressure in the sections set towards the wind with this wind direction in relation to the ventilator. Much the same conditions are obtained with five sections and so six sections constitute a limiting value, as stated. The need for at least six sections can also be expressed so that the angle between two partitions which delimit the respective passage sections (a regular star shape is presupposed) should be so small that regardless of the direction of an external flow of air, at least two of the partitions belonging to any passage section facing the flow of air always have a substantially oblique inclination to the main direction of the flow of air.

ADVANTAGES

By applying the principles which are proposed in connection with the invention, a ventilator is thus obtained which provides a satisfactory and even effect with different wind directions and which does not need to use any movable devices for its adaptation to different wind directions.

PREFERRED FORMS OF EMBODIMENT

Figure 5:
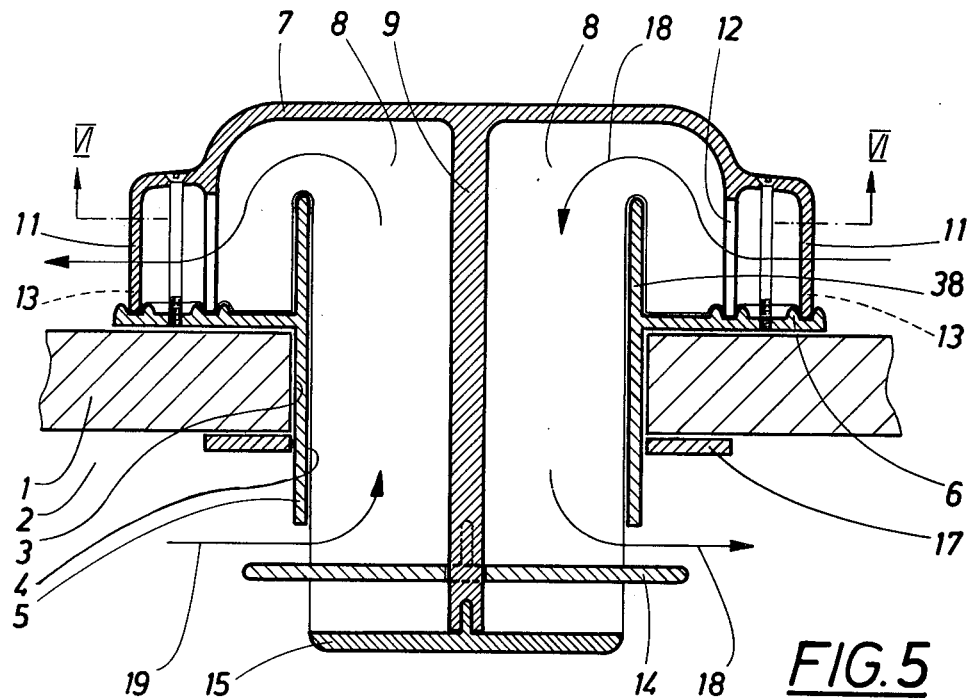
FIG. 5 is an axial section through the ventilator of FIG. 4 on the line V—V in FIG. 6.

From the form of embodiment shown in FIG. 5, it can be seen that the ventilator is mounted in a partition wall 1 between a delimited space 2 and the outside air. In this case, the ventilator is mounted in an opening 3 in said partition wall so that a connecting passage 4 is formed by a ventilation drum 5 which comprises a flange 6 mounted with a sealing action against the outside of the partition wall. The ventilator comprises a hood 7 which is closed in the upward direction and from which a plurality of partitions 8 extend downwards internally, extending in a plurality of planes extending through the centre axis of the ventilator, that is to say the longitudinal axis 9 of the connecting passage 4 and being directed radially outwards from said axis. These partitions delimit a plurality of passage sections 10, eight in the example, into which said connecting passage is divided according to the invention.

Figure 4:
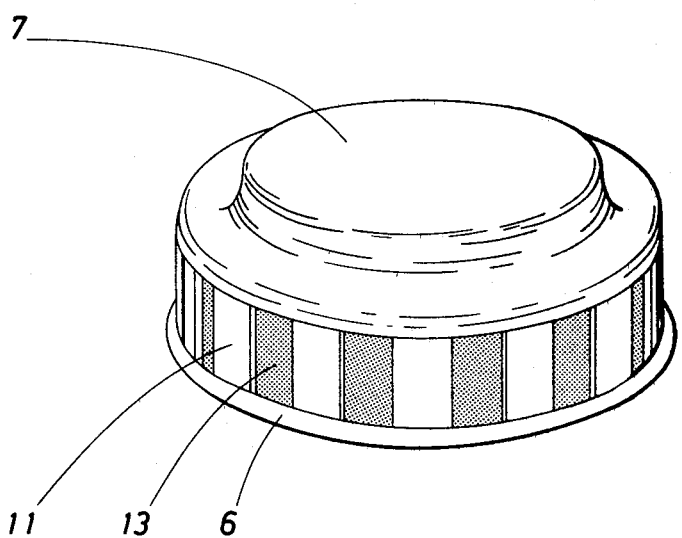
FIG. 4 is a perspective view of the ventilator according to the invention.

The hood 7 is connected to the flange 6 by a number of outer and inner wall portions 11, 12 which serve as water breaks. Between these are provided outer openings 13 which are in communication with the associated passage sections 10. The ventilation drum 5 comprises a collar 38 which serves as an obstacle to water. The hood 7 and the openings 13 are also shown in FIG. 4.

The partitions 8 extend through the connecting passage 4 and into said delimited space 2 and are crossed by a regulating disc 14 which comprises slits extending in the form of a star through which the partitions 8 extend and which are displaceable in height to regulate the flows of air. 15 designates a cover which limits the movement of the regulating disc. By means of the regulating disc 14, an inner opening 16 is obtained in each passage section 10, which opening is directed sideways like said outer openings 13. 17 designates a cover plate which is connected on the one hand to the ventilation drum 4 and on the other hand to the partition wall 1, which may consist, for example, of a roof in a boat cabin, a caravan or a house.

The arrows 18 and 19 in FIG. 5 indicate the path of the flow of air which is oppositely directed in two passage sections 10 situated opposite one another, in accordance with the principle of the invention. What is important for the air circulation in the delimited space 2 is that the flows of air are directed sideways and substantially follow the inside of the partition wall 1, as a result of which a satisfactory circulation is obtained in the space as a result of the fact that the incoming air is conveyed along the partition wall, for example horizontally and then falls down, while the spent air in the space, which normally has a higher temperature than the incoming air, rises in the direction of the partition wall 1 and flows along this towards the ventilator from substantially the opposite direction in relation to the incoming stream of air and is evacuated in the direction of the arrows 19.

Figure 7:
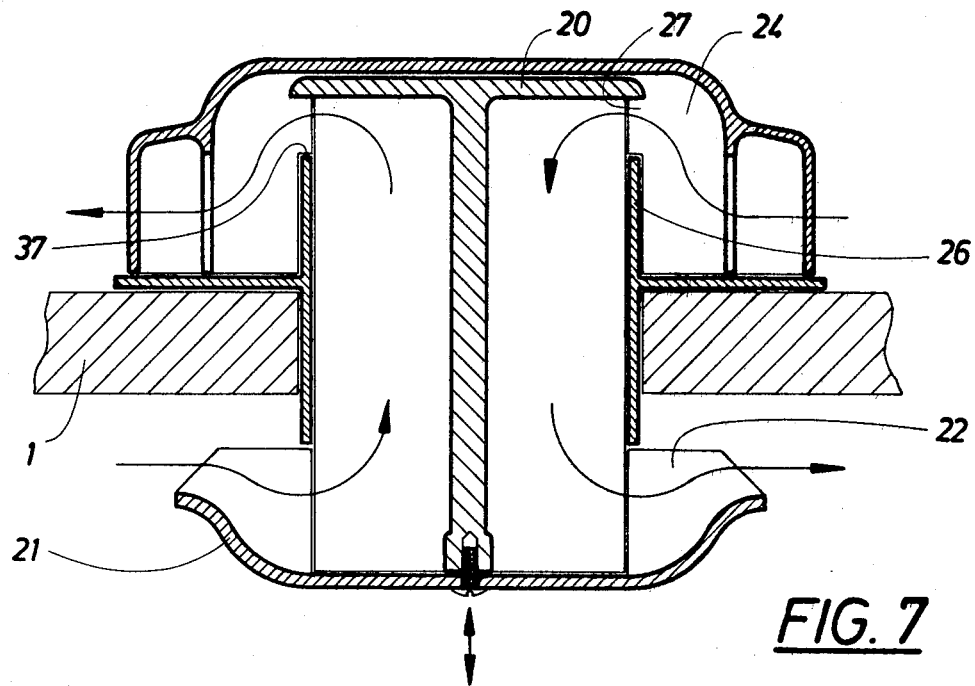

FIG. 7 shows another form of embodiment of the ventilator which can be completely shut off by means of an upper valve disc 20, which forms a coherent unit with a lower valve disc 21 which is dished and comprises radially directed disc-shaped elements 22. These form extension members of the partitions 23 which extend between the upper and the lower valve discs. 24 designates portions of the partitions which are rigidly connected to the hood 25, while the unit with the valve discs 20 and 21 and the partition portions 23 is displaceable in height between an open position, the upper position shown in the Figure, and a closed position in which the upper valve disc bears against the annular bearing surfaces 37 of the collar 26. The unit which is displaceable in height can be fixed in position by means of a friction device, snap device or the like. According to an advantageous modification, the displaceable unit may be so balanced that it automatically closes the ventilator if water flows in and collects in the dished lower valve disc 21 and causes the closing by the weight of the water. In order to ensure that the various portions 23 and 24 of the partitions are in line with one another, the upper valve disc 20 is provided with recesses which cooperate with the portions 24 of the partitions, the edges 27 forming guides.

Figure 8:
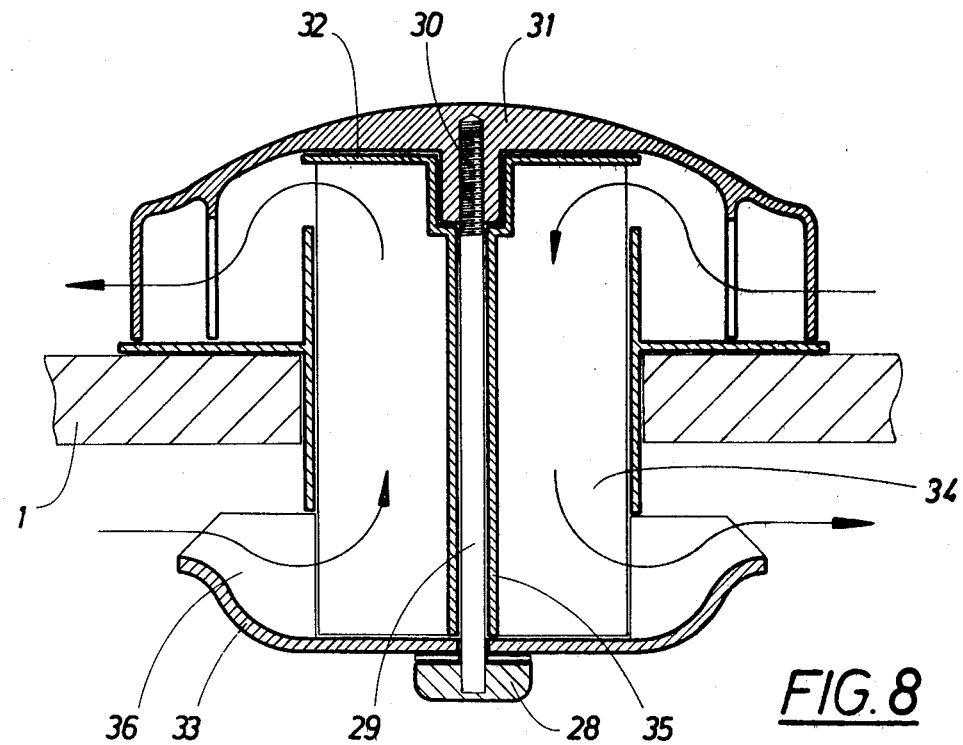

In the third form of embodiment shown in FIG. 8, the alteration in height of the displaceable unit is brought about by means of a screw device which consists of a spindle 29 which can be turned by a knob 28 and which is in mesh, through a threaded portion 30 with the hood 31. The upper valve disc 32 is guided in a corresponding manner to the form of embodiment shown in FIG. 5, as a result of which turning of the unit which is displaceable in height and which consists of the upper valve disc 32, the partition portions 34 and a tubular portion 35 is avoided, while the lower valve disc 33 and the partition portions 36 are turned on turning of the screw device.

Figure 6:
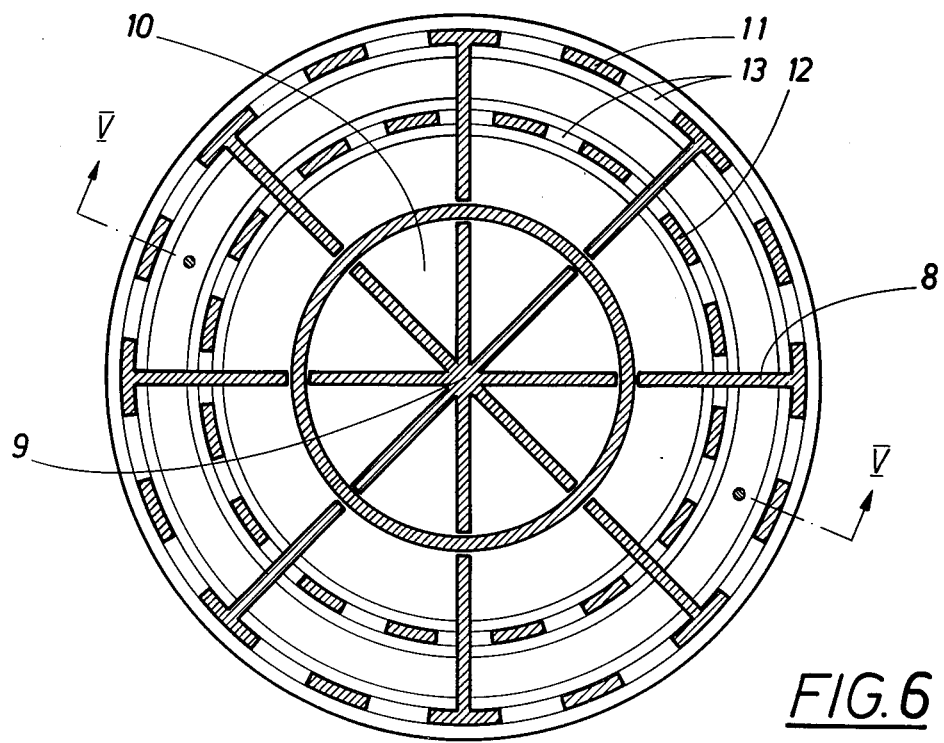
Figure 9:
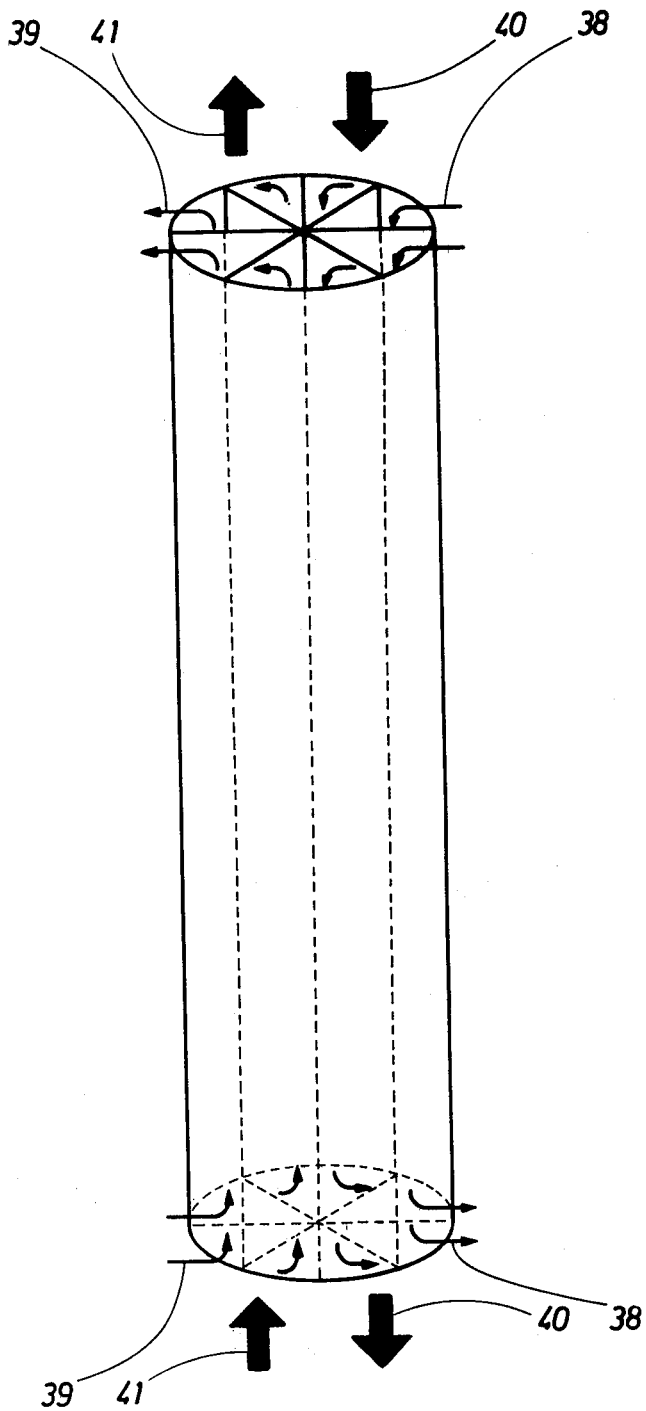
FIG. 9 shows diagrammatically the use of the ventilator as a heat exchanger.

FIG. 9 shows diagrammatically that the ventilator according to the invention can also be used as a heat exchanger and be equipped to advantage with a relatively long ventilation drum so that large contact surfaces are obtained between inflowing fresh air and evacuated room air. The Figure only shows the connecting passage with the portions of the partitions situated in this. The other parts of the ventilator can be made, for example, in accordance with the form of embodiment shown in FIG. 5 but the embodiments shown in FIGS. 5 and 6 are also conceivable.

The direction of the inflowing fresh air is indicated by arrows which are designated by 38 while the direction of the outflowing room air is designated by arrows 39. The arrows 40 and 41 indicate diagrammatically the main direction of flow of the fresh air and room air respectively in the heat exchanger.

INDUSTRIAL APPLICABILITY

Figure 10:
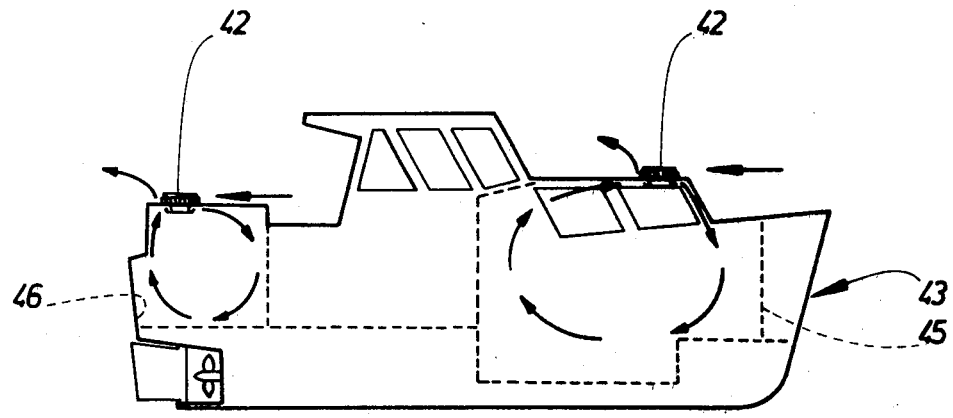
FIGS. 10–12 show diagrammatically a couple of examples of the installation of the ventilator according to the invention in boats and the path of the air flows with the heating unit respectively disconnected and connected up.
Figure 11:
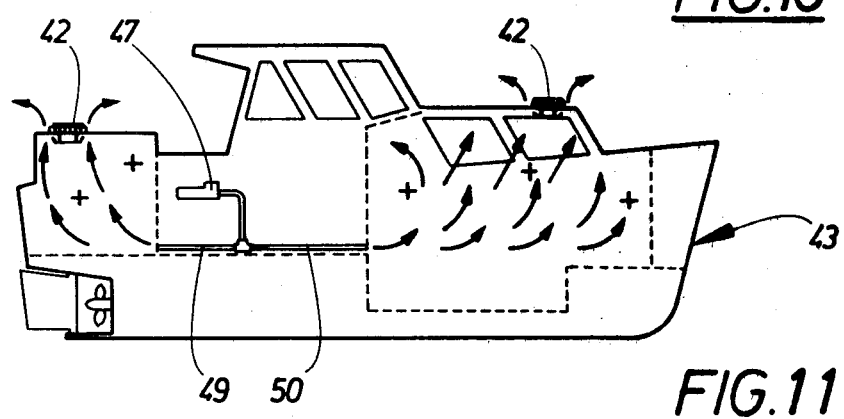
Figure 12:
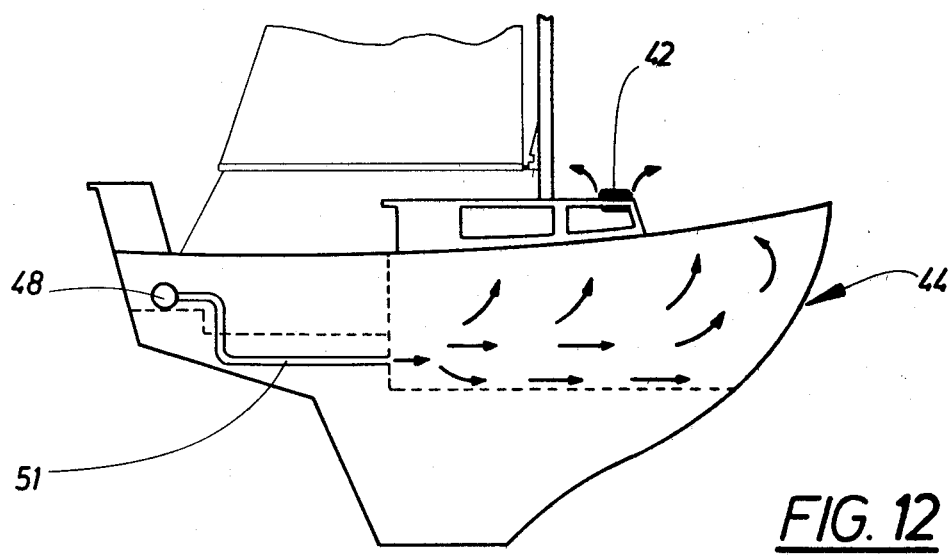

FIGS. 10-12 show examples of the installation of the ventilator 42 according to the invention in a motor boat 43 and a sailing boat 44. The motor boat 43 comprises both a forward cabin and an after cabin 45, 46. When no heating unit is in operation, the ventilator works with the wind as a driving force in the manner described above, an exchange of air being obtained substantially in accordance with the arrows shown in FIG. 8. When a boat is provided with a heating unit 47, 48 with a fan connected in, warm air is introduced into the cabins via warm-air ducts 49, 50, 51 and excess pressure is obtained in the cabins. In this case, the ventilator automatically reduces the supply of fresh air but evacuates spent room air in proportion to the warm air supplied. When the heating unit is not in operation, the ventilator again works automatically with the wind as a driving force. A boat equipped with a heating unit can thus be made with ventilation ducts in the conventional manner.

The passage sections can be formed otherwise than as shown, for example in the form of a tube for each section which comprises opening ends directed sideways.

What is claimed is:

1. A ventilator for air ventilation between a delimited space and the outside air, said ventilator being adapted to be inserted in an opening in a partition wall between said space and the outside air and also adapted to form a connecting passage therebetween, said passage being divided into a plurality of passage sections, at least one external, partly closed, cover portion and partitions separating said passage sections from each other, said partitions being directed symmetrically with substantially the same length outwards from a central longitudinal axis of said connecting passage, each of said sections being adapted to maintain communication between the outside air and said space and also comprising in its outer end, facing the outside air, a number of outer openings and in its inner end facing said space a number of inner openings, at least said outer openings being directed sideways in relation to said longitudinal axis so as to be distributed over the periphery of the ventilator, said passage sections and said partitions being eight in number and with the angle between two adjacent partitions amounting to 45°, said cover portion being provided with a peripheral substantially circularly extended wall which by means of said outer openings is divided into a plurality of wall portions, and covering part of the outer end of the connecting passage, said outer openings and said wall portions being at least two in number for each passage section, said partition having end portions positioned outside of said partition wall between said space and the outside air and extending radially outwards up to said circularly extending peripheral wall, and said inner openings being directed sideways in relation to the longitudinal axis of the connecting passage, and the passage sections comprising at their inner end an adjustable wall portion for varying their effective length.

2. A ventilator as claimed in claim 1, wherein the outer openings are situated radially outside the connecting passage, said passage comprising a collar which extends outside said partition wall and is adapted to prevent the infiltration of water.

3. A ventilator as claimed in claim 1, wherein the outer openings consist of a number of openings formed in said peripheral circularly extended wall, and of openings situated inside relative to the last-mentioned openings and formed in an annular wall and are angularly offset about the longitudinal axis of the connecting passage in relation to the openings in said extended wall so that the streams of air, and also incoming streams of water, are caused to follow a path deviating from a straight line in their passage between the outside air and said passage sections of the ventilator.

4. A ventilator as claimed in claim 1, wherein said partitions extend radially outside the periphery of the connecting passage at least at the outer end of the passage sections.

5. A ventilator as claimed in claim 1, wherein outflowing air transfers heat to incoming air via the partitions between the outflowing and incoming air.

* * * * *